(12) United States Patent
Dhulipala et al.

(10) Patent No.: US 10,947,433 B2
(45) Date of Patent: Mar. 16, 2021

(54) PROTEINS FOR REMOVING SULFUROUS COMPOUNDS AND/OR ACIDIC COMPOUNDS IN DOWNHOLE FLUIDS

(71) Applicant: Baker Hughes, LLC, Houston, TX (US)

(72) Inventors: Prasad D. Dhulipala, Katy, TX (US); Charles D. Armstrong, Tomball, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 117 days.

(21) Appl. No.: 15/744,967

(22) PCT Filed: Aug. 10, 2015

(86) PCT No.: PCT/US2015/044475
§ 371 (c)(1),
(2) Date: Jan. 15, 2018

(87) PCT Pub. No.: WO2017/027002
PCT Pub. Date: Feb. 16, 2017

(65) Prior Publication Data
US 2018/0208822 A1   Jul. 26, 2018

(51) Int. Cl.
*E21B 21/00* (2006.01)
*C09K 8/035* (2006.01)
*C09K 8/54* (2006.01)
*C23F 11/173* (2006.01)

(52) U.S. Cl.
CPC ............... *C09K 8/035* (2013.01); *C09K 8/54* (2013.01); *C23F 11/173* (2013.01); *E21B 21/003* (2013.01); *C09K 2208/20* (2013.01); *C09K 2208/32* (2013.01)

(58) Field of Classification Search
CPC ...... C09K 8/035; C09K 8/54; C09K 2208/20; C09K 2208/32; E21B 21/003
See application file for complete search history.

(56) References Cited

U.S. PATENT DOCUMENTS

| | | | |
|---|---|---|---|
| 2002/0020527 A1 | 2/2002 | Kilaas et al. | |
| 2006/0259995 A1* | 11/2006 | Cayouette | A61P 31/12 800/18 |
| 2010/0212888 A1* | 8/2010 | Hendrickson | C09K 8/582 166/246 |
| 2011/0171719 A1* | 7/2011 | Baldwin | C02F 1/50 435/235.1 |
| 2012/0031618 A1* | 2/2012 | Armstrong | C09K 8/685 166/305.1 |
| 2012/0073821 A1 | 3/2012 | Holtsclaw et al. | |
| 2014/0090833 A1* | 4/2014 | Weaver | C09K 8/035 166/246 |
| 2014/0166294 A1 | 6/2014 | Sorrells | |
| 2016/0017208 A1* | 1/2016 | Coates | C12N 1/20 507/274 |

FOREIGN PATENT DOCUMENTS

| | | |
|---|---|---|
| CN | 103983636 A | 8/2014 |
| WO | 2012021255 A1 | 2/2012 |
| WO | 2012116032 A1 | 8/2012 |
| WO | 2014052519 A1 | 4/2014 |
| WO | 2014099191 A1 | 6/2014 |
| WO | 2015105495 A1 | 7/2015 |

OTHER PUBLICATIONS

WO 2017027002 International Search Report dated May 10, 2016.
Hung, Shao-Chung, et al., "Membrane Lysis by the Anti Bacterial Peptides Cecropins B1 and B3: A Spin-Label Electron Spin Resonance Study on Phospholipid Bilayers", Biophysical Journal, vol. 77, Dec. 1999, 3120-3133.

* cited by examiner

*Primary Examiner* — Silvana C Runyan

(74) *Attorney, Agent, or Firm* — Mossman, Kumar & Tyler, P.C.

(57) ABSTRACT

Proteins with antibacterial properties may be used in additive compositions, fluid compositions, and methods for decreasing or removing sulfur-containing compounds and/or acid-containing compounds from recovered downhole fluids and/or the subterranean reservoir wellbore from which the downhole fluid was recovered. The fluid composition may include at least protein and a base fluid. The protein(s) may be or include a labiase, a lysozyme, a lysostaphin, a hexose oxidase, a cecropin, a thermolysin, a serine protease, a cysteine protease, and combinations thereof. The base fluid may be or include a drilling fluid, a servicing fluid, a production fluid, a completion fluid, an injection fluid, a refinery fluids, and combinations thereof.

13 Claims, No Drawings

PROTEINS FOR REMOVING SULFUROUS COMPOUNDS AND/OR ACIDIC COMPOUNDS IN DOWNHOLE FLUIDS

TECHNICAL FIELD

The present invention relates to additive compositions, fluid compositions, and methods for using at least one protein having antibacterial properties in a downhole fluid, and more specifically relates to decreasing or removing bacteria that produces reduced sulfur compounds and/or acids in the downhole fluid by adding at least one protein to the downhole fluid, such as a labiase, a lysozyme, a lysostaphin, a hexose oxidase, a cecropin, a thermolysin, a serine protease, a cysteine protease, and combinations thereof.

BACKGROUND

The presence of foulant species (e.g. sulfur-metabolizing species and/or acid-containing compounds) in hydrocarbon fluids and aqueous streams is undesirable for various reasons. The subterranean reservoirs currently being developed have increased amounts of foulants within the produced hydrocarbon streams (oil and gas).

During combustion, acidic and/or sulfur-rich hydrocarbon streams produce heavy environmental pollution. When such streams contact metals, foulant species lead to brittleness in carbon steels and to stress corrosion cracking in more highly alloyed materials. Moreover, foulants in various hydrocarbon or aqueous streams pose a safety hazard and a corrosion hazard. A quick removal of these odorous and environmentally malicious species would be desirable in both oilfield and refinery operations.

For the reasons mentioned, attempts have been made to wash out, or chemically convert, the foulants from hydrocarbon fluids and aqueous systems. Several classes of chemicals are available for removing sulfur species and/or acid-containing compounds from a hydrocarbon or aqueous stream, but many of them have serious limitations. However, the chemical have various limitations related to safety, efficacy, and the like.

The foulants are deleterious in the subterranean reservoir wellbores in which they reside. Additives may be added to the downhole fluids for circulation into the reservoir wellbore. The downhole fluids may be or include drilling fluids, completion fluids, servicing fluids (e.g. fracturing fluids), production fluids, injection fluids, and combinations thereof. Drilling fluids are typically classified according to their base fluid. In water-based fluids, solid particles, such as weighting agents, are suspended in a continuous phase consisting of water or brine. Oil can be emulsified in the water, which is the continuous phase. "Water-based fluid" is used herein to include fluids having an aqueous continuous phase where the aqueous continuous phase can be all water or brine, an oil-in-water emulsion, or an oil-in-brine emulsion. Brine-based fluids, of course are water-based fluids, in which the aqueous component is brine.

Oil-based fluids are the opposite or inverse of water-based fluids. "Oil-based fluid" is used herein to include fluids having a non-aqueous continuous phase where the non-aqueous continuous phase is all oil, a non-aqueous fluid, a water-in-oil emulsion, a water-in-non-aqueous emulsion, a brine-in-oil emulsion, or a brine-in-non-aqueous emulsion. In oil-based fluids, solid particles are suspended in a continuous phase consisting of oil or another non-aqueous fluid. Water or brine can be emulsified in the oil; therefore, the oil is the continuous phase. In oil-based fluids, the oil may consist of any oil or water-immiscible fluid that may include, but is not limited to, diesel, mineral oil, esters, refinery cuts and blends, or alpha-olefins. Oil-based fluid as defined herein may also include synthetic-based fluids or muds (SBMs), which are synthetically produced rather than refined from naturally-occurring materials. Synthetic-based fluids often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

There are a variety of functions and characteristics that are expected of completion fluids. The completion fluid may be placed in a well to facilitate final operations prior to initiation of production. Completion fluids are typically brines, such as chlorides, bromides, and/or formates, but may be any non-damaging fluid having proper density and flow characteristics. Suitable salts for forming the brines include, but are not necessarily limited to, sodium chloride, calcium chloride, zinc chloride, potassium chloride, potassium bromide, sodium bromide, calcium bromide, zinc bromide, sodium formate, potassium formate, ammonium formate, cesium formate, and mixtures thereof. Chemical compatibility of the completion fluid with the reservoir formation and formation fluids is key. Chemical additives, such as polymers and surfactants are known in the art for being introduced to the brines used in well servicing fluids for various reasons that include, but are not limited to, increasing viscosity, and increasing the density of the brine. Completion fluids do not contain suspended solids.

Production fluid is the fluid that flows from a formation to the surface of an oil well. These fluids may include oil, gas, water, as well as any contaminants (e.g. $H_2S$, asphaltenes, etc.). The consistency and composition of the production fluid may vary.

Refinery fluids are fluids that may be further processed or refined at a refinery. A non-limiting example of a refinery process may include reducing or preventing the formation of foulants other than the acid-containing compounds and/or sulfurous components. Non-limiting examples of other foulants may be or include hydrates, asphaltenes, coke, coke precursors, naphthenates, inorganic solid particles (e.g. sulfates, oxides, scale, and the like), and combinations thereof. Non-limiting examples of fluids to be refined include crude oil, production water, and combinations thereof.

Servicing fluids, such as remediation fluids, stimulation fluids, workover fluids, and the like, have several functions and characteristics necessary for repairing a damaged well. Such fluids may be used for breaking emulsions already formed and for removing formation damage that may have occurred during the drilling, completion and/or production operations. The terms "remedial operations" and "remediate" are defined herein to include a lowering of the viscosity of gel damage and/or the partial or complete removal of damage of any type from a subterranean formation. Similarly, the term "remediation fluid" is defined herein to include any fluid that may be useful in remedial operations. A stimulation fluid may be a treatment fluid prepared to stimulate, restore, or enhance the productivity of a well, such as fracturing fluids and/or matrix stimulation fluids in one non-limiting example.

Hydraulic fracturing is a type of stimulation operation, which uses pump rate and hydraulic pressure to fracture or crack a subterranean formation in a process for improving the recovery of hydrocarbons from the formation. Once the crack or cracks are made, high permeability proppant relative to the formation permeability is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates that can cause the fluids to degrade and prematurely settle out the proppant before the fracturing operation is complete. Various fluids have been developed, but most commercially used fracturing fluids are aqueous based liquids that have either been gelled or foamed to better suspend the proppants within the fluid.

Injection fluids may be used in enhanced oil recovery (EOR) operations, which are sophisticated procedures that use viscous forces and/or interfacial forces to increase the hydrocarbon production, e.g. crude oil, from oil reservoirs. The EOR procedures may be initiated at any time after the primary productive life of an oil reservoir when the oil production begins to decline. The efficiency of EOR operations may depend on reservoir temperature, pressure, depth, net pay, permeability, residual oil and water saturations, porosity, fluid properties, such as oil API gravity and viscosity, and the like.

EOR operations are considered a secondary or tertiary method of hydrocarbon recovery and may be necessary when the primary and/or secondary recovery operation has left behind a substantial quantity of hydrocarbons in the subterranean formation. Primary methods of oil recovery use the natural energy of the reservoir to produce oil or gas and do not require external fluids or heat as a driving energy; EOR methods are used to inject materials into the reservoir that are not normally present in the reservoir.

Secondary EOR methods of oil recovery inject external fluids into the reservoir, such as water and/or gas, to re-pressurize the reservoir and increase the oil displacement. Tertiary EOR methods include the injection of special fluids, such as chemicals, miscible gases and/or thermal energy. The EOR operations follow the primary operations and target the interplay of capillary and viscous forces within the reservoir. For example, in EOR operations, the energy for producing the remaining hydrocarbons from the subterranean formation may be supplied by the injection of fluids into the formation under pressure through one or more injection wells penetrating the formation, whereby the injection fluids drive the hydrocarbons to one or more producing wells penetrating the formation. EOR operations are typically performed by injecting the fluid through the injection well into the subterranean reservoir to restore formation pressure, improve oil displacement or fluid flow in the reservoir, and the like.

Examples of EOR operations include water-based flooding and gas injection methods. Water-based flooding may also be termed 'chemical flooding' if chemicals are added to the water-based injection fluid. Water-based flooding may be or include, polymer flooding, ASP (alkali/surfactant/polymer) flooding, SP (surfactant/polymer) flooding, low salinity water and microbial FOR; gas injection includes immiscible and miscible gas methods, such as carbon dioxide flooding, and the like.

It would be desirable if additives were developed for fluid compositions used during hydrocarbon recovery to decreas-ing or removing bacteria that produces reduced sulfur compounds and/or acids in recovered downhole fluids and in hydrocarbon reservoir wellbores.

SUMMARY

There is provided, in one form, an additive composition to be added to a base fluid, such as but not limited to, a drilling fluid, a completion fluid, a production fluid, a servicing fluid, an injection fluid, a refinery fluid, and combinations thereof. The additive composition may have or include at least one protein, such as but not limited to, a labiase, a lysozyme, a lysostaphin, a hexose oxidase, a cecropin, a thermolysin, a serine protease, a cysteine protease, and combinations thereof.

There is provided, in a non-limiting form, a fluid composition having a base fluid and at least one protein, such as but not limited to, a labiase, a lysozyme, a lysostaphin, a hexose oxidase, a cecropin, a thermolysin, a serine protease, a cysteine protease, and combinations thereof. The base fluid may be or include, but is not limited to, drilling fluids, servicing fluids, production fluids, completion fluids, injection fluids, refinery fluids, and combinations thereof.

There is further provided in an alternative non-limiting embodiment of a method that may include circulating a fluid composition into a subterranean reservoir wellbore and decreasing or removing bacteria that produces reduced sulfur compounds and/or acids in the subterranean reservoir wellbore and/or in a downhole fluid recovered from a subterranean reservoir wellbore. The fluid composition may have or include at least one protein, such as but not limited to, a labiase, a lysozyme, a lysostaphin, a hexose oxidase, a cecropin, a thermolysin, a serine protease, a cysteine protease, and combinations thereof.

The protein(s) appear to decreasing or removing bacteria that produces reduced sulfur compounds and/or acids from recovered downhole fluids and/or in subterranean reservoir wellbores.

DETAILED DESCRIPTION

It has been discovered that an additive composition having at least one protein may be added to a base fluid to decrease an amount of sulfur-reducing bacteria and/or acid-producing bacteria in the base fluid by preventing or inhibiting bacteria from producing the sulfur-containing compounds and/or the acid-containing compounds. The protein (s) may be or include a labiase, a lysozyme, a lysostaphin, a hexose oxidase, a cecropin, a thermolysin, a serine protease, a cysteine protease, and combinations thereof. In addition to being biodegradable, the protein(s) may be less toxic to the environment and may be made from renewable resources. The use of the protein(s) in a base fluid may provide a renewable alternative to conventional additives (non-biodegradable) that are used in downhole fluids to decrease an amount of acid-containing compounds and/or sulfur-containing compounds by decreasing, preventing and/or inhibiting the sulfur-reducing bacteria and/or the acid-producing bacteria.

The protein(s) may remove (e.g. decrease, inactivate, and/or inhibit) the bacteria and prevent the bacteria from producing acid-containing compounds and/or sulfur-containing compounds within a recovered downhole fluid from a subterranean reservoir wellbore and/or decrease the amount of acid-containing compounds and/or sulfur-containing compounds in the wellbore from which the downhole fluid was recovered. 'Decrease', 'inactivate', and/or 'inhibit' may include bactericidal properties inflicted upon the bacteria to where the bacteria is therefore no longer capable of producing such compounds; may include preventing the bacteria from further replication; and/or inactivating the ability of the bacteria to produce such compounds. By decreasing, inactivating, and/or inhibiting the bacteria from producing the compound(s), such compound(s) may cause less fouling or damage to equipment, e.g. downhole equipment, refinery equipment, etc.

Sulfur-containing compounds may be any compounds that include sulfur, such as but not limited to, sulfur-containing compounds found in downhole fluids and/or subterranean reservoir wellbores. Non-limiting examples of the sulfur-containing compounds may be or include thiols, hydrogen sulfide ($H_2S$), mercaptans, and combinations thereof.

Acid-containing compounds may be any compounds that have a pH less than about 7, such as but not limited to, acid-containing compounds found in downhole fluids and/or subterranean reservoir wellbores. Non-limiting examples of the acid-containing compound(s) may be or include organic acids, such as but not limited to lactic acid, acetic acid, formic acid, and combinations thereof.

Non-limiting examples of the bacteria that may be decreased and/or prevented from producing sulfur-containing compounds and/or acid-containing compounds may be or include, but not limited to, Lactobacillus, Aerococcus, Streptococcus, Staphylococcus, Desulfovibrio sp., Deltaproteobacteria (e.g. Desulfobacterales, Desulfovibrionales, and/or Synthrophobacterales), Firmicutes (e.g. Desulfotomaculum, Desulfosporomusca and/or Desulfosporosinus), Nitrospirae (e.g. Thermodesulfovibrio), Archaea (e.g. Archaeoglobus, Thermocladium, and/or Caldivirga), Thermophiles (e.g. Thermodesulfobacteria and/or Thermodesulfobium), and combinations thereof. The protein(s) may at least partially lyse cell walls from many bacteria, such as gram (+) and gram (−) bacteria that produce acid-containing compounds and/or sulfur-containing compounds. At least one cofactor may be included in the additive composition and/or added to the base fluid when forming the fluid composition in a non-limiting embodiment. Cofactor(s) may aid the protein in decreasing and/or inhibiting the bacteria from producing the sulfur-containing compounds and/or the acid-containing compounds. Non-limiting examples of the cofactor(s) may be or include divalent cations and/or flavin adenine dinucleotide (FAD), nicotinamide (NAD), and combinations thereof. The divalent cations may be or include, but are not limited to, copper, zinc, calcium, nickel, and combinations thereof.

The labiase protein may have α-1,4-N-acetyl-D-glucosaminidase activity and lysozyme activity, which allows the labiase to lyse the cell wall of the bacteria. The lysozyme may have N-acetylmuramide glycanhydrolase properties for catalyzing the hydrolysis of 1,4-beta-linkages between N-acetyl muramic acid and N-acetyl-D-glucosamide residues in a peptidoglycan. In addition or in the alternative, the lysozyme may cleave between N-acetyl-D-glucosamide residues in chitodetrins. The lysostaphin may include metalloendopeptidase activity, such as glycylglycine endopeptidase activity in a non-limiting embodiment. The lysostaphin may cleave the cross-linking pentaglycin bridges in the cell wall of the bacteria, such as gram (+) bacteria in a non-limiting embodiment.

The hexose oxidase enzyme may catalyze the reaction between D-glucose and oxygen ($O_2$) into D-glucono-1,5-lactone and hydrogen peroxide ($H_2O_2$). The cecropin may lyse cell walls and/or cell membranes by inhibiting proline uptake by the bacteria in a non-limiting embodiment. The thermolysin may catalyze hydrolysis of peptide bonds containing hydrophobic amino acids. The thermolysin may be a thermostable neutral metalloproteinase enzyme produced from Bacillus thermoproteolyticus in a non-limiting embodiment.

The protein(s) may be isolated from recombinant proteins or purchased from companies who specialize in isolating the particular protein. For example, the lysozyme may be a protein in an E. Coli Lysis buffer, and the lysozyme may be isolated therefrom in a non-limiting embodiment. The lysostaphin may be obtained from Sigma (e.g. L7386) in a non-limiting embodiment. The cecropin may be obtained from Genscript (e.g. RP 11225) in a non-limiting embodiment. The thermolysin may be obtained from Sigma (e.g. T7902) in a non-limiting embodiment. Although each company may isolate a particular protein from a particular bacteria, it is foreseeable that a particular protein for use in decreasing/inhibiting bacteria that produce acid-containing compounds and/or sulfur-containing compounds may be obtained from any company or isolated from any bacteria as long as the protein targets the bacteria that produce the acid-containing compounds and/or the sulfur-producing bacteria.

For example, Sigma isolates the lysostaphin from Staphylococcus staphylolticus; however, it is foreseeable that a lysostaphin isolated from another bacteria may be used or added to the base fluid as long as the protein targets the acid-producing bacteria that forms the acid-containing compounds and/or targets the sulfur-producing bacteria that forms the sulfur-containing compounds. 'Isolated' is defined herein to denote that the protein has been removed from the intact cells or cellular debris of recombinant cells (e.g. E. coli cells comprising the protein of interest), and is in a condition other than its native environment, is free of other extraneous or unwanted nucleic acids, proteases, and lipids, in a form suitable for use as a protein as described herein.

The protein(s) may be in a powder form and/or a liquid form (e.g. in solution) when added to or included in the base fluid. The protein(s) may be part of an additive where the additive includes the protein(s), as well as other proteins to aid the protein(s) in decreasing the amount of acid-containing compounds and/or sulfur-containing compounds in a fluid composition and/or a subterranean reservoir wellbore.

In a non-limiting embodiment, the protein(s) may maintain optimal function at a temperature ranging from about 20° C. independently to about 130° C., alternatively from about 40° C. independently to about 80° C. The protein(s) may maintain optimal function at a pH ranging from about 4 independently to about 11, alternatively from about 5 independently to about 8. The protein(s) may still function at a decreased reaction rate, if at all, outside of the ranges mentioned for temperature, pressure, and/or pH.

'Enzyme' is defined herein to be or include the active site of the enzyme to lyse a cell wall of a gram (+) or gram (−) bacteria. The active site may be or include the whole protein, an active fragment of the protein, a mimetic of the protein, and combinations thereof. 'Fragment' as used herein is meant to include any amino acid sequence shorter than the full-length protein, but where the fragment maintains similar activity to the full-length protein. Fragments may include a single contiguous sequence identical to a portion of the protein sequence. Alternatively, the fragment may have or include several different shorter segments where each segment is identical in amino acid sequence to a different portion of the amino acid sequence of the protein, but linked via amino acids differing in sequence from the protein.

'Mimetic' as used herein may include polypeptides, which may be recombinant, and peptidomimetics, as well as small organic molecules, which exhibit similar or enhanced catalytic activity as compared to the enzyme(s)/protein(s) described herein.

'Derived from' with respect to the protein(s) is meant to include whole protein(s) or protein fragments; 'derived from' also encompasses polypeptides identical in DNA and/or amino acid sequence to the active site. 'Recombinant DNA' is DNA that has been formed artificially by combining constituents from different organisms, such as inserting the enzyme and/or protein into an *E. coli* host cell for a cloned reproduction of the protein(s) in a non-limiting example.

'Derived from' also includes derivatives of the protein(s), such as a polypeptide or fragment that may be substantially similar in primary structural sequence to an enzyme described herein, but which may include chemical and/or biochemical modifications that are not found in the native polypeptide. Such modifications may be or include, but are not limited to a label, such as a radioactive isotope, a fluorophore, or an enzymatic label useful in tracing the protein. The label or other modification may be useful in isolating the protein(s) and/or identifying the protein(s). For example, the label or other modification may be used to identify the protein(s) once the downhole fluid composition needs to be recovered from a subterranean reservoir wellbore and/or recovering the protein(s) from the fluid composition. Other non-limiting modifications may be or include a nucleotide mutagenesis to impart additional thermostability and pH tolerance to the protein(s), additional tolerance to a salinity outside the range of an unmodified protein, improved catalytic activity, and combinations thereof.

The additive may be added to a base fluid to form a fluid composition. The base fluid may be or include, but is not limited to, a drilling fluid, a completion fluid, a production fluid, a servicing fluid, an injection fluid, a refinery fluid, and combinations thereof. In a non-limiting embodiment, the base fluid may be an aqueous fluid, a non-aqueous fluid, and combinations thereof. In another non-limiting embodiment, the base fluid or fluid composition may be contained in an oil pipeline, gas pipeline, a refinery (e.g. separation vessels, dehydration units, gas lines, and pipelines), and combinations thereof.

In a non-limiting embodiment, the protein(s) may be added to the base fluid in a concentration that is substantially equal to or more than the amount of suspected acidic compounds and/or sulfur-containing compounds present in the base fluid and/or the subterranean reservoir wellbore. Alternatively, the concentration of the protein(s) within the additive composition may range from about 0.01 mg/mL independently to about 100 mg/mL based on the total amount of the base fluid, alternatively from about 1 mg/mL independently to about 90 mg/mL, or from about 10 mg/mL independently to about 60 mg/mL. As used herein with respect to a range, "independently" means that any threshold may be used together with another threshold to give a suitable alternative range, e.g. about 0.1 mg/mL independently to about 1 mg/mL is also considered a suitable alternative range.

In a non-limiting embodiment, the additive composition comprises a blend of at least two proteins. In a non-limiting example, the blend may have or include a labiase and a lysozyme. Alternatively, the blend may have or include at least a labiase and a lysostaphin. In yet another non-limiting example, the blend may have or include a labiase, a lysozyme, a lysostaphin, and combinations thereof. One or all of the remaining protein(s)—a hexose oxidase, a cecropin, and/or a thermolysin—may be added to any of the blends mentioned. Of course, other blends comprising any combination of two or more proteins is envisaged and encompassed in the claim language.

In a non-limiting embodiment, the blend may include each protein within the additive composition in an amount ranging from about 0.1 mg/mL independently to about 10 mg/mL based on the total amount of the additive composition, alternatively from about 1 mg/mL independently to about 9 mg/mL, or from about 2 mg/mL independently to about 7 mg/mL.

The base fluid of the fluid composition may include at least one acid-containing compound and/or at least one sulfur-containing compound. Once the additive is added to the base fluid (to form the fluid composition), the fluid composition includes the acid-containing compound(s) and/or the sulfur-containing compound(s) in a decreased amount as compared to an identical fluid composition absent the protein(s).

In yet another non-limiting embodiment, the fluid composition may include a salt, such as but not limited to, a brine, sea salt, and combinations thereof. The brine may be or include, but is not limited to potassium chloride, sodium chloride, calcium chloride, zinc chloride, potassium bromide, sodium bromide, calcium bromide, zinc bromide, sodium formate, potassium formate, ammonium formate, cesium formate, and combinations thereof.

The method may include decreasing the amount of at least one sulfur-reducing bacteria and/or at least one acid-producing bacteria and thereby decrease an amount of at least one acid-containing compound and/or sulfur-containing compound within the fluid composition and/or within a subterranean reservoir wellbore. Parameters that may be used to assess the effectiveness of the protein(s) may include measurements of protein formation kinetics, amount of acid-containing compounds and/or sulfur-containing compounds present in the recovered downhole fluids and/or subterranean reservoir wellbore before and after treatment with the additive and/or fluid composition, and the like. Methods for measuring these parameters may be used to assess the ability of the protein to reduce, decrease, or inactivate sulfur-reducing bacteria and/or acid-producing bacteria. 'Effective concentration' is defined herein to mean any concentration of protein(s) that may remove the bacteria from producing acid-containing compounds and/or sulfur-containing compounds within the fluid composition, a subterranean reservoir wellbore and a downhole fluid recovered therefrom; alternatively, 'effective concentration' is defined herein to mean any amount of the protein that may decrease the amount of acid-containing compounds and/or sulfur-containing compounds.

The invention will be further described with respect to the following Examples, which are not meant to limit the invention, but rather to further illustrate the various embodiments.

EXAMPLES

For all of the examples, the lysozyme was obtained from Open Biotechnology as a component of *E. coli* Lysis buffer; the stock mixture was 10 mg/mL. The lysostaphin was obtained from Sigma as L7386, Lot 014M4009v, and a 10 mg/mL stock was made therefrom. The Cecropin B was obtained from Genscript as RP 11225 Lot P19641412, and a 1 mg/mL stock was made therefrom. The 5% Postgate media bottles for sulfate reducing bacteria (#4645) were obtained from Biotech Solutions. The 6% phenol dextrose media bottles for acid producing bacteria (#1903) were obtained from Biotech solutions. The water mixture was a mix of produced water from the field of Mars WEMCO, the field of Atlantis PW, and Galveston sea water.

The $2^{nd}$ set (Lysozyme at 10 mg/mL) was the only set that did not have any samples with positive bacterial growth; however, the fourth set also decreased the bacterial growth as compared to the control set (the first set). Said differently, lysozyme at a concentration as low as 0.01 mg/mL decreased the SRB growth by 50%, and a lysozyme concentration of 0.1 mg/mL decreased the SRB growth by 100%.

TABLE 1

| Positive Bacterial Growth for Each Dilution Set for Example 1 | | | | | | | |
|---|---|---|---|---|---|---|---|
| 1 | 2 | 3 | 4 | 5 | 6 | 7 | 8 |
| Control No protein | Lysozyme 10 mg/ml | Lysostaphin 10 mg/ml | Lysozyme 1 mg/ml | Lysostaphin 1 mg/ml | Cecropin B 1 mg/ml | Lysozyme + Lysostaphin 1 mg/ml | Lysozyme + Lysostaphin + Cecropin B 1 mg/ml |
| | | | | Bottles with positive growth | | | |
| 4 out of 8 | 0 out of 8 | 4 out of 8 | 2 out of 8 | 4 out of 8 | 4 out of 8 | 4 out of 8 | 4 out of 8 |

Example 1: Effect of Lysozyme, Lysostaphin, Cecropin B on the Growth of Sulfate Reducing Bacteria A bottle of 5% Postgate media containing sulfate reducing bacteria was obtained, and a 0.5 mL sample was taken from the bottle and diluted. A first set of serial dilutions including 7 serial dilutions was made from 1 mL of the diluted culture. A second set, a third set, a fourth set, a fifth set, a sixth set, a seventh set, and an eighth set of serial dilutions having 7 serial dilutions were made from the 1 mL of the diluted culture according to the same procedure.

The first set of serial dilutions was the control and did not have any protein added thereto. The second set had 100 µl of lysozyme (10 mg/mL) added thereto. The third set had 100 µl of lysostaphin (10 mg/mL) added thereto. The fourth set had 100 µl of lysozyme (1 mg/mL). The fifth set had 100 µl of Lysostaphin (1 mg/mL) added thereto. The sixth set had cecropin B (1 mg/mL) added thereto.

The seventh set had a combination of lysozyme and lysostaphin (1 mg/mL) added thereto. The combination of lysozyme and lysostaphin for the seventh set were prepared by first preparing a stock solution of 1 mg/mL lysozyme and a stock solution of 1 mg/mL of lysostaphin. The combination included a 1:1 ratio of lysozyme and lysostaphin where 1 mL was used for the seventh set. Said differently, 500 uL of lysozyme and 500 uL of lysostaphin were combined for use with the eighth set.

The eighth set had a combination of lysozyme and lysostaphin and cecropin B (1 mg/mL) added thereto. The combination of lysozyme, lysostaphin, and cecropin B for the eighth set were prepared by first preparing a stock solution of 1 mg/mL lysozyme, a stock solution of 1 mg/mL of lysostaphin, and a stock solution of 1 mg/mL cecropin B. The combination included a 1:1:1 ratio of lysozyme to lysostaphin to cecropin B where 1 mL was used for the eighth set. Said differently, 333 uL of lysozyme, 333 uL of lysostaphin, and 333 uL of cecropin B were combined for use with the eighth set.

Each set of dilutions was incubated for 14 or 21 days at 35 C after the addition of the protein(s). The number of samples within each set having positive bacterial growth is shown in Table 1.

Example 2: Effect of Lysozyme on the Growth of Acid Producing Bacteria 1 mL of the water mixture was added to a bottle of 6% of fresh phenol red dextrose media. A 1 mL sample was taken from the bottle and diluted. A first set of serial dilutions including 7 serial dilutions was made from 1 mL of the diluted culture. A second set and a third set of serial dilutions having 7 serial dilutions were made from the 1 mL of the diluted culture according to the same procedure.

The first set of serial dilutions was the control and did not have any protein added thereto. The second set had 100 µl of lysozyme (10 mg/mL) added thereto. The third set had 100 µl of lysozyme (1 mg/mL) added thereto.

Each set of samples was incubated for 14 or 21 days at 35 C after the addition of the protein. The number of samples within each set having positive bacterial growth are shown in Table 2.

The second and third set decreased the bacterial growth compared to the control set (the first set).

TABLE 2

| Positive Bacterial Growth for Each Dilution Set for Example 2 | | |
|---|---|---|
| 1 | 2 | 3 |
| Control No protein | Lysozyme 10 mg/ml | Lysozyme 1 mg/ml |
| | Bottles with positive growth | |
| 5 out of 8 | 1 out of 8 | 2 out of 8 |

In the foregoing specification, the invention has been described with reference to specific embodiments thereof, and has been described as effective in providing methods, additive compositions, and fluid compositions for decreasing and/or removing acid-containing compound and/or sulfur-containing compounds in downhole fluids circulated in a subterranean reservoir wellbore. However, it will be evident that various modifications and changes can be made thereto without departing from the broader scope of the invention as set forth in the appended claims. Accordingly, the specification is to be regarded in an illustrative rather than a restrictive sense. For example, specific base fluids, specific proteins, additional proteins, and the like falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the additive composition for a base fluid, such as a drilling fluid, a completion fluid, a production fluid, a servicing fluid, an injection fluid, a refinery fluid, and combinations thereof may consist of or consist essentially of at least one protein selected from the group consisting of a labiase, a lysozyme, a lysostaphin, a hexose oxidase, a cecropin, a thermolysin, a serine protease, a cysteine protease, and combinations thereof.

The fluid composition may consist of or consist essentially of a base fluid and at least one protein selected from the group consisting of a labiase, a lysozyme, a lysostaphin, a hexose oxidase, a cecropin, a thermolysin, a serine protease, a cysteine protease, and combinations thereof; the base fluid may be or include, but is not limited to a drilling fluid, a completion fluid, a production fluid, a servicing fluid, an injection fluid, a refinery fluid, and combinations thereof.

The method may consist of or consist essentially of circulating a fluid composition into a subterranean reservoir wellbore; the fluid composition may have or include at least one protein selected from the group consisting of a labiase, a lysozyme, a lysostaphin, a hexose oxidase, a cecropin, a thermolysin, a serine protease, a cysteine protease, and combinations thereof in an effective concentration to remove bacteria from producing acid-containing compounds and/or sulfur-containing protein compounds in downhole fluids.

The words "comprising" and "comprises" as used throughout the claims, are to be interpreted to mean "including but not limited to" and "includes but not limited to", respectively.

What is claimed is:

1. A method comprising:
    circulating a fluid composition into a subterranean reservoir wellbore;
        wherein the fluid composition comprises:
            brine;
            at least one sulfur-containing compound and/or at least one acid-containing compound;
            at least one protein selected from the group consisting of a labiase, a lysozyme, a cecropin, a thermolysin, and combinations thereof, where the at least one protein is present in a concentration ranging from 0.01 mg/mL to 100 mg/mL based on the total amount of a base fluid within the fluid composition to at least partially lyse the cell walls of bacteria and consequently at least partially remove bacteria from producing sulfur-containing compounds and/or acid-containing compounds; and
    decreasing an amount of acid-containing compounds and/or sulfur-containing compounds in the subterranean reservoir wellbore and/or downhole fluids recovered therefrom;
where the fluid composition has a temperature ranging from about 20° C. to about 130° C. and a pH ranging from about 4 to about 11.

2. The method of claim 1, wherein the fluid composition comprises at least two proteins as a blend.

3. The method of claim 2, wherein the blend comprises each protein in an amount ranging from 0.1 mg/mL to 1 mg/mL based on the total amount of the fluid composition.

4. The method of claim 1, wherein the fluid composition further comprises a cofactor useful with the at least one protein.

5. The method of claim 4, wherein the cofactor is selected from the group consisting of divalent cations, flavin adenine dinucleotide (FAD), nicotinamide (NAD), and combinations thereof.

6. The method of claim 1 where the at least one protein is selected from the group consisting of a labiase, a lysozyme, a cecropin, a and combinations thereof.

7. The method of claim 1 where the fluid composition is selected from the group consisting of a drilling fluid, a completion fluid, a production fluid, a servicing fluid, an injection fluid, and combinations thereof.

8. A method comprising:
    circulating a fluid composition into a subterranean reservoir wellbore;
        wherein the fluid composition comprises:
            brine;
            at least one sulfur-containing compound and/or at least one acid-containing compound;
            at least one protein selected from the group consisting of a labiase, a lysozyme, a cecropin, a thermolysin, and combinations thereof, where the at least one protein is present in a concentration ranging from 0.01 mg/mL to 100 mg/mL based on the total amount of a base fluid within the fluid composition to at least partially lyse the cell walls of bacteria and consequently at least partially remove bacteria from producing sulfur-containing compounds and/or acid-containing compounds; and
            a cofactor useful with the at least one protein; and
    decreasing an amount of acid-containing compounds and/or sulfur-containing compounds in the subterranean reservoir wellbore and/or downhole fluids recovered therefrom;
where the fluid composition has a temperature ranging from about 20° C. to about 130° C. and a pH ranging from about 4 to about 11.

9. The method of claim 8, wherein the fluid composition comprises at least two proteins as a blend.

10. The method of claim 9, wherein the blend comprises each protein in an amount ranging from 0.1 mg/mL to 1 mg/mL based on the total amount of the fluid composition.

11. The method of claim 8, wherein the cofactor is selected from the group consisting of divalent cations, flavin adenine dinucleotide (FAD), nicotinamide (NAD), and combinations thereof.

12. The method of claim 8 where the at least one protein is selected from the group consisting of a labiase, a lysozyme, a cecropin, a and combinations thereof.

13. The method of claim 8 where the fluid composition is selected from the group consisting of a drilling fluid, a completion fluid, a production fluid, a servicing fluid, an injection fluid, and combinations thereof.

* * * * *